May 1, 1934.　　　　G. RAMSEY　　　　1,956,624
SOUND MOVING PICTURE
Filed May 9, 1931　　　4 Sheets-Sheet 1

George Ramsey
INVENTOR.

May 1, 1934.  G. RAMSEY  1,956,624
SOUND MOVING PICTURE
Filed May 9, 1931  4 Sheets-Sheet 2

INVENTOR.
George Ramsey

May 1, 1934.   G. RAMSEY   1,956,624
SOUND MOVING PICTURE
Filed May 9, 1931   4 Sheets-Sheet 4

George Ramsey
INVENTOR.

Patented May 1, 1934

1,956,624

UNITED STATES PATENT OFFICE 1,956,624

SOUND MOVING PICTURE

George Ramsey, Brooklyn, N. Y.

Application May 9, 1931, Serial No. 536,117

10 Claims. (Cl. 274—5)

The present invention relates to sound moving pictures.

One well known type of sound moving picture comprises a film with a picture zone area and a sound record at one side of the picture zone area.

In silent moving pictures, the rate of speed at which the pictures are taken and projected is predetermined solely by the picture speed which is most practical and desirable. This speed is normally from sixteen to eighteen pictures per second. Where a sound record of the usual linear type is recorded on the same film as the pictures, an additional problem arises because a film speed of sixteen or eighteen pictures per second which is proper for normal photography, is too slow for sound recording on the ordinary linear sound track. Therefore, the custom has been to increase the linear speed of the film, which necessarily increases the number of pictures per second and the usual rate for sound pictures is about twenty-four pictures per second. This linear speed is about the minimum linear speed for correct sound recording, but it is a much higher speed than is necessary or desirable for normal photography. The result is that in order to make a sound record on a film, considerably more film must be used for each scene, and considerably faster lenses are required for the camera; and the wear upon the film and the mechanism is greatly increased by the higher linear speed.

It is the common practice to project pictures at a predetermined rate of speed. It is also common practice to vary the speed at which pictures are taken in order to obtain desired effects. For example, where it is desirable to increase the apparent speed of movement of an object when the picture is projected over the actual speed of the object which was photographed, the operator takes the picture at a slow rate. Where it is desired to produce so called "slow motion" pictures, the pictures are photographed at a very rapid rate. When these pictures are projected at the normal rate of speed, then the projection speeds up the motion where the scenes were taken slowly and slows up the motion where the scenes were taken very rapidly.

Heretofore, it has not been possible to photograph a sound record simultaneously with scenes which were photographically either slowed up or speeded up when the picture is taken, and which film when developed and printed was run through a normal speed projector and sound reproducer. The reason for this difficulty is apparent in that if a sound record is made on a slow moving film, by the old methods, the sound track has the same rate of movement as the picture track. If this film now be run through a reproducer and projector at a normal rate, the sound will immediately change in pitch and will be distorted. If on the other hand, the pictures are taken rapidly and the sound recorded at the same time on the same film, and these pictures run through a normal speed projector and reproducer, the pitch will again be changed and the sound distorted so as to be unnatural.

The present invention overcomes the difficulties of the known prior art in that the present invention enables the operator to record sound on a film at a speed which is not entirely dependent on the movement of the film in a linear direction for recording scenes photographically.

In accordance with the present invention, the sound recording line or point moves relative to the film while the film is moving so that there are two factors of movement in the preferred form of the present invention. It is also possible with the present invention to record and reproduce the sound on the film during the stationary period of an intermittent movement, like a picture feed movement while the pictures are being taken or projected. In this case, it is necessary to coordinate the movement of the tone recording member with the picture intervals so that the linear space in the sound track devoted to the record of sound, for a particular series of pictures comprising a scene, shall be equal to the length of the corresponding picture intervals.

From the foregoing, it will be observed that the present invention permits the operator to utilize the correct desired speed for photographing and projecting a scene and at the same time use a different speed on the sound track, as to the point of recording the sound relative to the film, which speed of recording on the sound track shall be the most desired speed for recording the particular sounds. It will also be observed that the present invention, therefore, provides for such flexibility between the sound recording and the picture taking as to enable the operator to use the correct speeds for sound and the correct speeds for photographing. Yet at the same time on projecting and reproducing, the sound record is always coordinated in its proper relation to the pictures, so that the primary object of sound pictures, namely, correct coordination of sound and pictures is not interfered with by the present invention.

More specifically, the present invention comprises recording the sound in sections or zones which are adapted to be synthesized into a linear sound track. Each zone terminates in a bridging or connecting area whereby the record of one zone is blended into the record of the succeeding zone without any perceptible interruption of the sound track. This may be accomplished in various ways, one of which is by tapering the end of each sound zone and recording the same sound simultaneously on the terminal end and the initial end of adjacent zones, so that the terminal end and the initial end of adjacent zones when matched together provide a substantially continuous sound track. The recording device is arranged and constructed so that when the adjacent zones are matched up relative to the sound wave there is no interruption of the sound due to matching up the several zones to form a linear track. This is of primary importance.

The present invention may be embodied in various forms and one preferred method and apparatus comprises a slitted disc provided with a multiple series of slits and with the disc mounted over a portion of continuously moving film in such manner as to expose two parallel paths on the film, one path recording sound through one set of slits and the other path recording sound through another set of slits so that the sound is recorded first in one path and then in another. Preferably, the movement of the slitted disc and the film are opposite, thereby increasing the effective speed and length of the sound record. The method of recording above referred to may be utilized on an intermittently moved film so that the disc revolves and the slits pass over the film which is stationary at the moment the sound record is made. It is preferred, however, to record upon a continuously moving portion of the film.

In reproducing the record to reproduce the sound, the mechanism is substantially reversed, that is, a slitted disc may be used with suitable reproducing apparatus, usually a photoelectric cell, amplifiers and a sound reproducer.

Where it is desired to take the picture series fast or slow, the speed of the recording disc in the camera is correspondingly varied so that the recording disc maintains a sound record speed which is constant relative to the picture projecting speed, for example, assuming the normal picture speed to be sixteen pictures per second and that the slitted disc rotates two revolutions per second. If now, the speed at which the pictures are taken be reduced to eight pictures per second, the speed of the disc will be increased to four revolutions per second. This increase of the speed of the slitted disc doubles the intervals between sound wave recordings so that when this film is run through a projector at the normal rate of sixteen picture frames per second, the sound wave recordings will be impressed on the reproducing instrument at the proper intervals per second to reproduce natural sounds the same as if the pictures and the record had been made at normal speed of sixteen pictures per second. If, on the other hand, the picture taking speed be increased to thirty-two per second, then the speed of the slitted disc will be reduced to one revolution per second. This makes a sound record so that when the pictures are run at the normal rate of sixteen pictures per second, the sound waves will be reproduced at the rate corresponding to the normal operation of the film. There are reasonable limits within which these ratios may be carried out. The slitted disc for high speeds of picture taking may be required to move so slowly as to make an impractical sound record, and, therefore, it is to be understood that while the above ratios are practical within a relatively wide range, it is possible to exceed this range at which time the relative speed for sound reproducing becomes impractical.

It is recognized that the present invention may be carried out in methods differing specifically from those herewith disclosed and in apparatus differing from the disclosure herewith without departing from the scope of the invention. The disclosure herewith, therefore, is to be understood as illustrative and not in the limiting sense.

Figure 1:
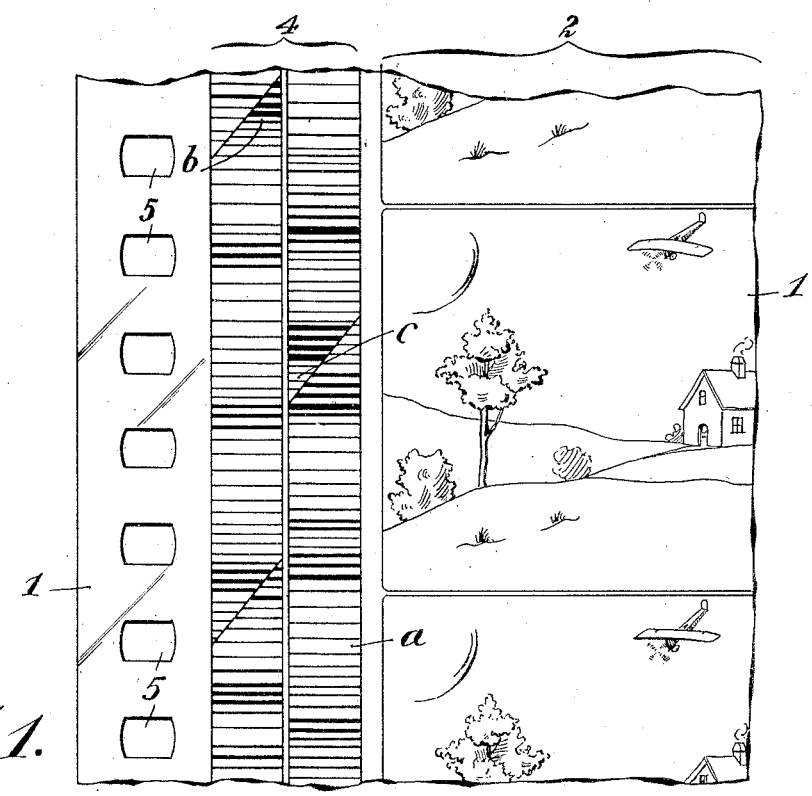
Fig. 1 shows a section of film according to the present invention.
Figure 2:
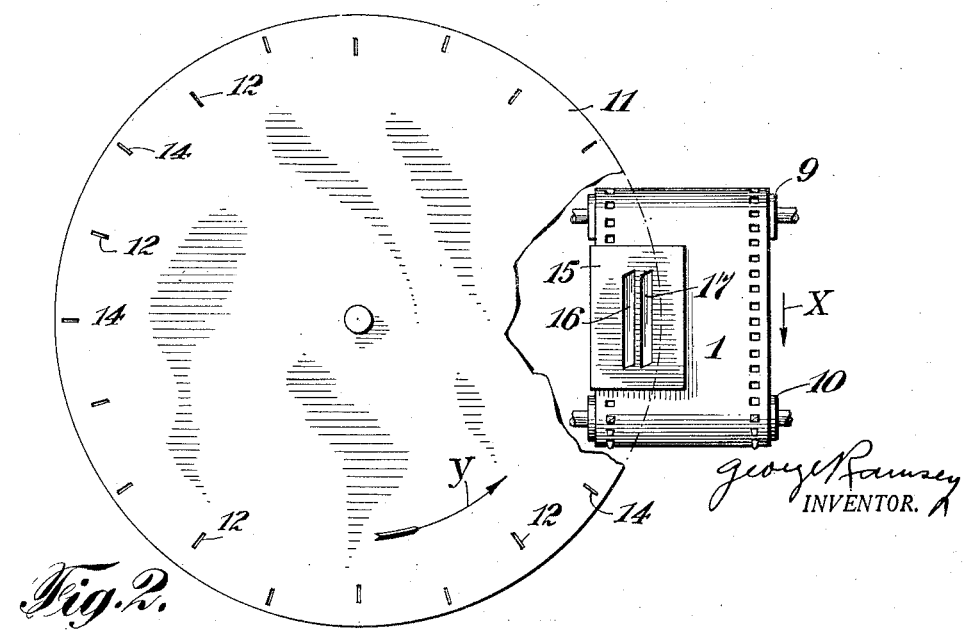
Fig. 2 is a diagrammatic view of mechanism to be associated with a camera to make the film shown in Fig. 1.
Figure 3:
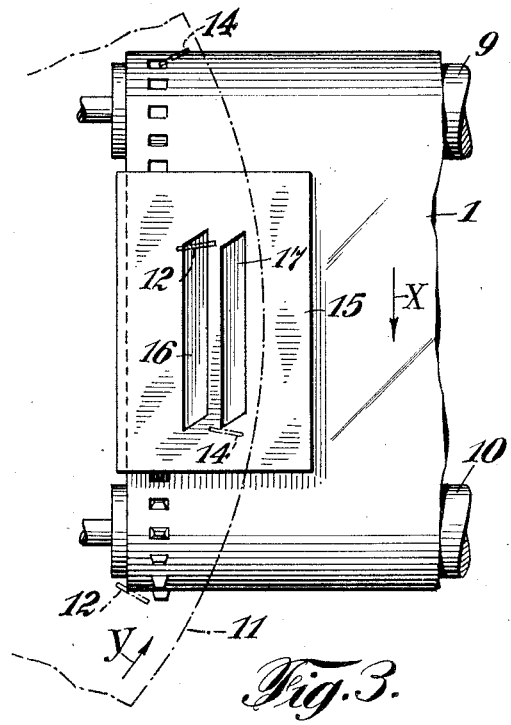
Fig. 3 illustrates an enlarged view of the aperture plate shown in Fig. 2.

Referring to the drawings and more especially to Figs. 1, 2 and 3, in accordance with the present invention, the film 1 comprises picture areas 2 and a sound track 4. The film is provided with the usual perforations 5 to permit the film to be run through standard apparatus. The sound track 4 is associated with the picture areas 2 in such manner that when the film is run through proper recording and reproducing apparatus, the sound of the sound track will be coordinated with the pictures on the picture areas.

Figures 4, 5:
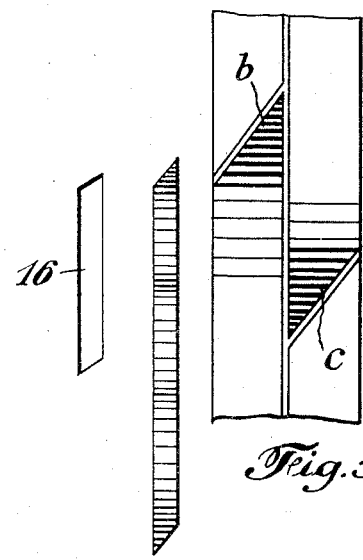
Fig. 4 illustrates the relation of length of one opening in the aperture plate to the length of the sound record photographed therethrough when the slitted disc and film are run in opposite directions at the same linear speed.
Fig. 5 illustrates the relation of identical sound recording at the terminal ends of two adjacent record zones.
Figure 6:
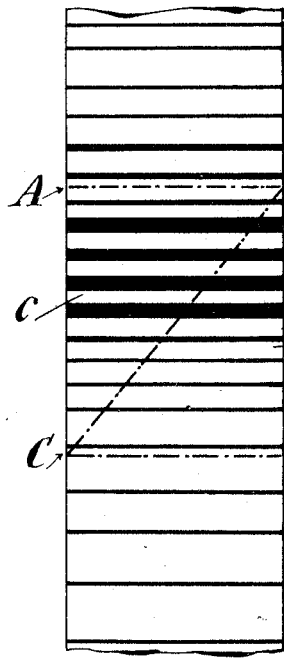
Fig. 6 illustrates how the terminal ends of adjacent sound zones are blended into a continuous linear sound track when the sound is reproduced.

The sound track comprises a plurality of zones, a, b, c, etc. These sound zones are adapted to be translated into a linear sound track as illustrated in Fig. 6, which sound track in its linear dimension is considerably longer than the actual linear length occupied on the film 1. These sound zones preferably are lengthwise on the film 1 and as illustrated in Figs. 5 and 6, the triangular end portions of each zone comprises a duplicate of the sound recorded on the triangular end of the next succeeding adjacent zone. As shown in Fig. 6, the sound recorded in the triangle of dotted lines A, B, C of zone *c* is exactly the same as the recording between dotted line triangle BCD of zone *b* and as illustrated in Fig. 6 when zone *c* is aligned with zone *b* in a linear alignment, the end limits of the zone disappear and the associated zones are one complete unbroken sound track. This is brought about by the triangular shape of the ends of each zone or by some other form of juncture which permits one zone to be blended into the other without distortion due to an abrupt ending and beginning of the zones. If the ends of the zones of the several sound tracks be terminated in square ends, it becomes extremely difficult to synthesize the zones into a linear series without an interruption between the zones which would cause a distortion in the sound as it is reproduced. It therefore is particularly desirable that the ends of the zones shall be so arranged as to permit one zone to gradually blend into the other without interruption. It is usual to reproduce sounds from a sound film by the use of a photoelectric cell and the sound is reproduced by variations of the light falling on the photoelectric cell. Therefore, if the area of the sound track varies from time to time, an unpleasant variation will be introduced and consequently, it is desirable that no mark or interruption of the sound track shall occur when the sounds are being reproduced. In the actual construction of the film, there are definite terminal lines at the end of each zone but these lines disappear so far as the reproduction is concerned when the sound is reproduced as will later be brought out in connection with the mechanics of this invention.

The mechanical adaptation of the present invention is disclosed diagrammatically in order to simplify the disclosure and it is to be understood that the intermediate mechanism for operating the parts is in accordance with the well known art applicable to this type of device.

Figure 7:
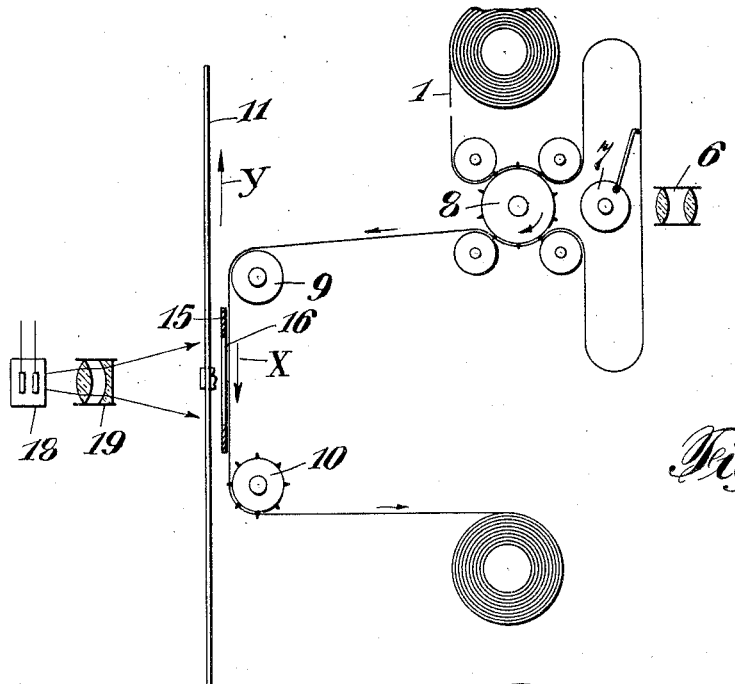
Fig. 7 is a diagrammatic elevational view of a picture-sound camera according to this invention.

Referring now more especially to Figs. 2 and 7, the present invention may be embodied in a mechanism in a camera (diagrammatically illustrated in Fig. 7) comprising the usual photographic mechanism such as the lens 6, the intermittent feed mechanism 7, the drive sprocket 8, and associated mechanism common in moving picture cameras. The film 1 runs to the sound recording station as is common in the art and may pass over a roller 9 to a roller or feed sprocket 10 to provide a sound recording zone between the roller 9 and the feed sprocket 10. It is to be understood that the film 1 proceeds from a suitable supply roll and is taken up on a suitable take-up roll as is common in the art.

The present invention comprises more especially a mechanism whereby the sound is recorded in the sound track 4 at a speed independent of the movement of the film. One mechanism whereby this may be accomplished is a slitted disc 11 provided with a multiple series of slits for example, slits 12 and 14 through which the recording light passes. An aperture plate 15 is arranged over the film so as to determine the edges of the sound track through the aperture openings 16 and 17. The sound recording valve is in accordance with the common practice in the art and for purpose of illustration may comprise a neon or other ionized gas type lamp 18 wherein the brilliancy of the lamp 18 is varied in accordance with the sound to be recorded. The rays from this lamp may fall upon a lens 19 to be concentrated over the area which will be traversed by the slits 12 and 14 as the disc 11 rotates. Preferably, the film between the rollers 9 and 10 moves at a constant speed in the direction of arrow X and preferably, the disc 11 also moves at a constant speed in the direction of the arrow Y. The disc 11 may be connected by suitable gearing, or belt drive with the roller 10 so that as the roller 10 rotates the disc 11 will also rotate at a predetermined speed relative to the movement of the film.

The distance between a slit of the series 12 and adjacent slits of the series 14 on the disc 11 is so spaced relative to the aperture openings 16 and 17 that as a slit 12 enters the terminal end portion of the aperture 16, a slit 14 enters the opposite end of the aperture opening 17 as illustrated in dotted lines in Fig. 3. In this way, it will be observed that simultaneous recordings of the same sound is made through the terminal end of the aperture opening 16 and the front end of the aperture opening 17 and vice versa. This produces a record as previously explained relative to Figs. 1, 5 and 6.

Figure 8:
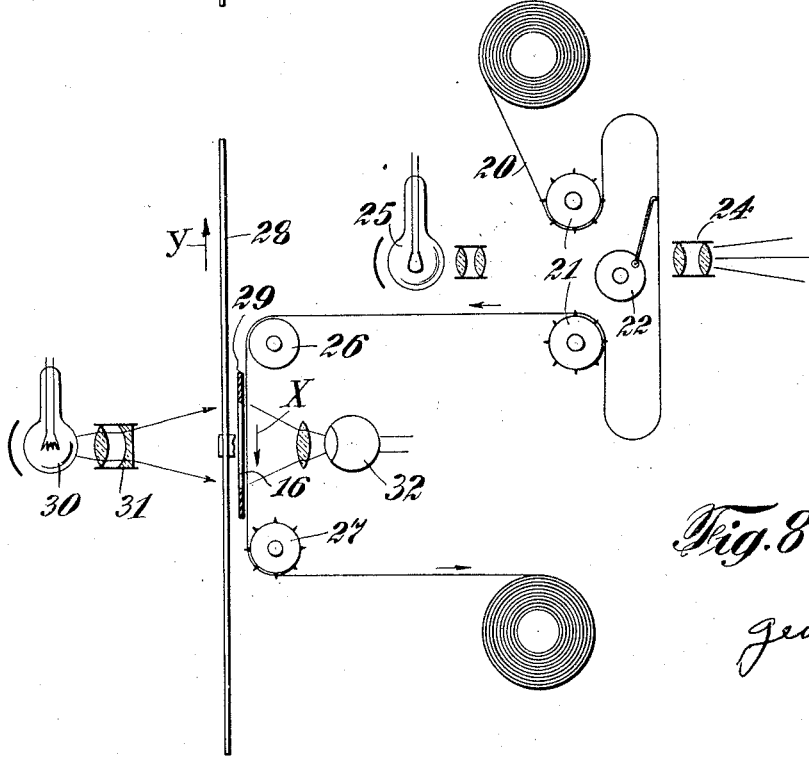
Fig. 8 is a diagrammatic elevational view of a picture-sound projector according to this invention.

Referring now to Fig. 8 which diagrammatically illustrates a projector, the positive film 20 runs from a suitable supply through the projector-reproducer past the driving sprocket 21 and through the intermittent movement mechanism 22 past the lens 24 and on to the sound reproducing station. A suitable source of light 25 projects the pictures through the lens 24, as is well known in the art.

The positive film 20 at the sound station may pass over a roller 26 and another roller 27 which may comprise a feed sprocket if desired. The film then passes to a suitable take-up mechanism. A disc 28, which is a duplicate of the disc 11 shown in Fig. 2 revolves over an aperture plate 29, which is a duplicate of the aperture plate 15. A constant source of light 30 may be concentrated on the disc 28 by condenser lenses 31. The light passing through the slits in the disc 28 fall upon the film 20 and proceed to strike the photoelectric cell 32. This photoelectric cell is connected up with amplifiers, horns, and other apparatus for reproducing the sound as is well known in the art. The projector-reproducer now analyzes the sound in coordination with the projection of the pictures so that the pictures and sound are reproduced in their proper relations.

Figure 9:
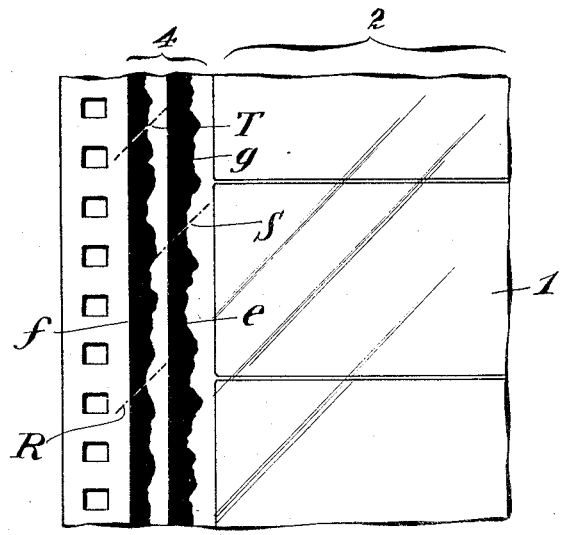
Fig. 9 illustrates a section of sound movie film having thereon a constant density variable area sound track.
Figures 10, 11:
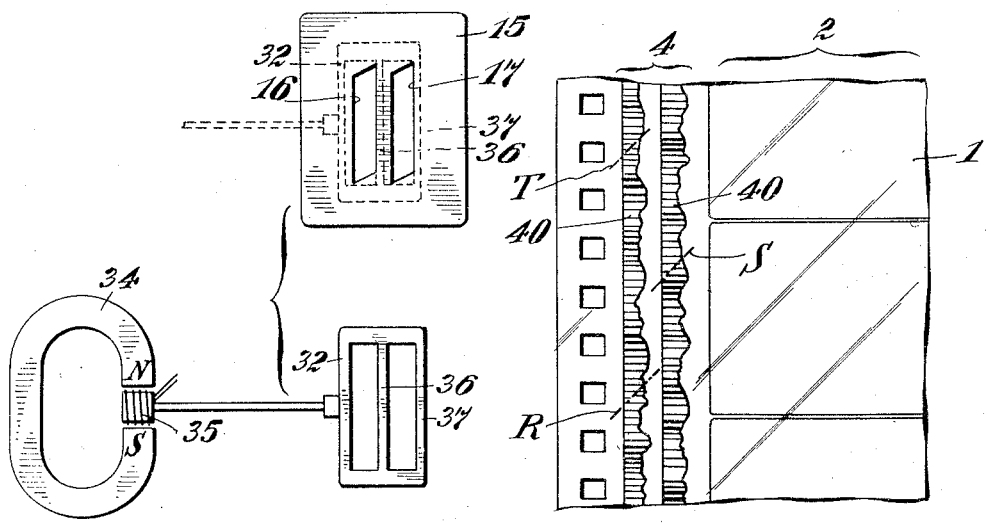
Fig. 10 illustrates a movable light valve associated with an aperture plate to produce the sound record shown in Fig. 9.
Fig. 11 illustrates a section of sound movie film wherein the sound track is made by using both the variable density and variable area systems of recording.

Figs. 1, 4, 5 and 6 illustrate and relate to sound recording by the constant area variable density system. Figs. 9 to 10 illustrate and relate to sound recording by the constant density variable area system, as applied to the present invention. Fig. 9 illustrates a section of sound film wherein the picture area 2 and sound track 4 are in the same relation as shown in Fig. 1, the difference being in the character of the sound recording in that the zones *e*, *f*, and *g*, are of constant density but of variable area. As shown in Fig. 10 a movable light valve 32 is mounted over the aperture plate 15 of the camera and variable light 18 is replaced by a constant intensity light. The light valve 32 may be actuated by suitable mechanism, as for example a motor comprising a permanent magnet 34 in which is mounted a coil 35 that is energized by a current that varies in accordance with the sound to be recorded. This coil 35 is connected with the light valve 32 so as to cause the light valve 32 to be reciprocated according to the variable current in the coil 35. The light valve 32 has a bar 36 which normally is adjacent the right edge of the aperture 16 and another bar 37 which is normally adjacent the right edge of aperture 17 of the aperture plate 15, as shown in Fig. 10. As the light valve 32 is reciprocated it narrows the effective area of the apertures 16 and 17 and as the slits 12 and 14 of the disc 11 sweep over the light valve 32 and aperture plate 15, these variations in effective width are translated into constant exposure zones with the right edge thereof comprising a wavy line, as shown in Fig. 9, thereby recording the sound by the variable area method. The finished film is now fed through the projector diagrammatically shown in Fig. 8 and the sound and picture are thus reproduced.

Fig. 11 illustrates a sound track 4 wherein the recording 40 is made by a combination of both systems of recording. This sound track is made by introducing the movable light valve 32 into the camera having the variable light source as shown in Fig. 7. In this modification the variable light 18 and the movable light valve 32 are connected to operate simultaneously so that, for example, when the light valve operates to decrease the area, the variable light operates to increase the density, and vice versa. The double system of recording doubles the recording effect and thus tends to double the amplitude of the reproduced sound waves. This permits obtaining the same sound effects with less amplification.

Figure 12:
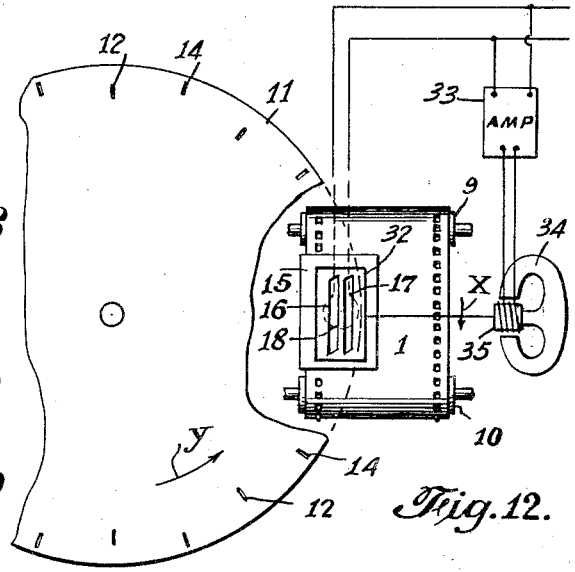
Fig. 12 illustrates diagrammatically a device comprising a combination of the mechanism illustrated in Figs. 2 and 10, whereby a sound record in accordance with Fig. 11 is produced.

Fig. 12 illustrates the mechanism for producing the sound track illustrated in Fig. 11, which comprises a sound record combining variable density and variable area. This mechanism is substantially the same as the mechanism illustrated in Fig. 2 with the addition of the light valve illustrated in Fig. 10. In the operation of the device, electric waves corresponding to the sound waves are transmitted to the variable lamp 18 (shown in Fig. 12 in dotted lines). These same waves pass through the amplifier 33 to the operating coil 35 of the motor which operates the light valve 32 to vary the area of the sound track in accordance with the sound wave to be recorded. The slitted disc 11 passes the slits 12 and 14 over the light valve 32, which cooperates with the aperture plate 15, and the light of the lamp 18 and the light valve 32 are varied simultaneously from the same variable current. The result is a record which varies both in area and in density and wherein both the density and the area represent the same sound wave.

In both Figs. 9 and 11 the terminals of the recording zones are indicated by dotted lines R, S and T. The sound recording 40 shown in Fig. 11, may also be reproduced in the projector diagrammatically shown in Fig. 8.

From the foregoing, it will be observed that the speed of the recording of the sound is independent to a large extent to the speed at which the pictures are taken. This enables the taking of the pictures and the projecting thereof to occur at the proper speed and also enables the recording of the sound and the reproduction thereof to occur at the proper speed. As previously explained, the operator may take the pictures at a speed which is either slower or faster than the normal rate and through suitable gearing the rate of the sound recording may be such that when the film is projected, the sound and pictures will be properly coordinated.

The foregoing results in substantial flexibility both as to taking of pictures and recording of sound and also results in a substantial economy in production of sound movie film.

What I claim is:—

1. An apparatus for recording sound upon a sound movie film comprising, means to move a portion of said film in the direction of its length, an aperture plate provided with a plurality of openings, and means to cause bands of light to move over each opening in said aperture plate to expose said moving film successively through said openings in said aperture plate.

2. In an apparatus for recording sound on a sound movie film strip, means to move a portion of said strip in the direction of its length, an aperture plate having a pair of openings therein over said portion of the film strip, and means to expose said moving strip alternately through said pair of aperture openings.

3. In an apparatus for recording sound on a sound movie film strip, means to move a portion of said strip in the direction of its length, an aperture plate having a pair of openings therein over said portion of the film strip, means comprising a disc having a plurality of rows of apertures to expose said strip alternately through said pair of aperture openings.

4. In an apparatus for recording sound on a sound movie film strip, means to move a portion of said strip in the direction of its length, an aperture plate having a pair of openings therein over said portion of the film strip, means comprising a disc having a plurality of rows of apertures to expose said strip alternately through said pair of aperture openings, and means to rotate said disc when said film is moving.

5. In a device for recording sound on a light sensitive film, means to move a light sensitive film, a source of light the intensity of which is varied in accordance with a sound wave, an aperture plate having a light aperture, a light valve operating to vary the width of said light aperture, means moving over said aperture plate and having a light slit to transmit a narrow band of light to said light aperture and means to operate said light valve to vary said aperture simultaneously with the variation of the intensity of said light from said source of light.

6. Means to record sound on a light sensitive film comprising means to move a light sensitive film continuously, an aperture plate having a pair of light apertures, a light valve operative to simultaneously vary the width of said apertures, a source of light adapted to be varied in intensity in accordance with a sound wave, means to operate said light valve in accordance with and simultaneously with the variation of the light intensity from said source, and means to record on said film alternately through said apertures.

7. Means to record sound on a light sensitive film comprising means to move a light sensitive film continuously, an aperture plate having a pair of light apertures, a light valve operative to simultaneously vary the width of said apertures, a source of light adapted to be varied in intensity in accordance with a sound wave, means to operate said light valve to vary the width of both of said apertures in accordance with and simultaneously with the variation of the light intensity from said source, and means to record on said film alternately through said apertures, and at a rate greater than the speed of movement of said film.

8. A sound recording mechanism comprising means to move continuously a light sensitive strip in the direction of its length, an aperture plate over a portion of said strip with a pair of openings in said aperture plate, and means to record sound on said strip alternately through said openings.

9. A sound recording mechanism comprising means to move continuously a light sensitive strip in the direction of its length, an aperture plate over a portion of said strip with a pair of openings in said aperture plate, and movable means to record sound on said strip alternately through said openings and at a rate greater than the speed of movement of said film.

10. An apparatus for sound reproduction and recording in the talking picture art comprising means to move a portion of a film in the direction of its length, a disc having a plurality of rows of apertures therein adapted to move over a portion of said film, and an aperture plate having the same number of apertures as there are rows of apertures in the said disc, a single row of apertures in said disc cooperating with a single aperture in said plate.

GEORGE RAMSEY.